US012146599B2

(12) United States Patent
Huang

(10) Patent No.: US 12,146,599 B2
(45) Date of Patent: Nov. 19, 2024

(54) VACUUM BREAKER VALVE

(71) Applicant: Chung-Yi Huang, Liaocuo Li (TW)

(72) Inventor: Chung-Yi Huang, Liaocuo Li (TW)

( * ) Notice: Subject to any disclaimer, the term of this patent is extended or adjusted under 35 U.S.C. 154(b) by 101 days.

(21) Appl. No.: 18/302,077

(22) Filed: Apr. 18, 2023

(65) Prior Publication Data

US 2024/0353045 A1    Oct. 24, 2024

(51) Int. Cl.
| | |
|---|---|
| F16K 15/14 | (2006.01) |
| E03B 7/10 | (2006.01) |
| F16K 15/02 | (2006.01) |
| F16K 27/02 | (2006.01) |
| F16L 55/07 | (2006.01) |
| E03B 7/12 | (2006.01) |

(52) U.S. Cl.
CPC ............ *F16L 55/07* (2013.01); *E03B 7/10* (2013.01); *F16K 15/026* (2013.01); *F16K 15/141* (2013.01); *F16K 15/144* (2013.01); *F16K 27/0209* (2013.01); *E03B 7/12* (2013.01); *F16K 2200/204* (2021.08); *Y10T 137/2557* (2015.04); *Y10T 137/3294* (2015.04); *Y10T 137/3331* (2015.04)

(58) Field of Classification Search
None
See application file for complete search history.

(56) References Cited

U.S. PATENT DOCUMENTS

| | | | | |
|---|---|---|---|---|
| 2,997,054 A | * | 8/1961 | Woodford | ............... E03C 1/104 |
| | | | | 137/859 |
| 3,850,190 A | * | 11/1974 | Carlson | ................... E03C 1/108 |
| | | | | 137/859 |
| 4,726,390 A | * | 2/1988 | Franklin | ................. E03C 1/108 |
| | | | | 137/859 |
| 4,893,644 A | * | 1/1990 | Giacomini | ............ F16K 15/144 |
| | | | | 137/859 |
| 5,094,261 A | * | 3/1992 | Giacomini | .............. E03C 1/108 |
| | | | | 137/859 |
| 7,458,388 B2 | * | 12/2008 | Huang | ...................... E03B 7/10 |
| | | | | 137/859 |
| 8,245,721 B2 | * | 8/2012 | Kuo | ........................ E03C 1/104 |
| | | | | 137/217 |
| 9,719,235 B1 | * | 8/2017 | Huang | ...................... E03B 7/12 |
| 9,719,606 B1 | * | 8/2017 | Yang | ..................... F16K 15/063 |
| 10,017,922 B2 | * | 7/2018 | Huang | ..................... F16K 3/22 |
| 10,378,667 B2 | * | 8/2019 | Huang | ................ F16K 31/1262 |
| 2005/0178434 A1 | * | 8/2005 | Yang | ........................ E03B 7/10 |
| | | | | 137/218 |
| 2015/0000771 A1 | * | 1/2015 | Chuang | ................... F16L 29/00 |
| | | | | 137/535 |
| 2018/0251968 A1 | * | 9/2018 | Huang | .................... E03C 1/102 |

\* cited by examiner

*Primary Examiner* — Matthew W Jellett
(74) *Attorney, Agent, or Firm* — Chun-Ming Shih; LANWAY IPR SERVICES

(57) ABSTRACT

A vacuum breaker valve includes a valve body and a vacuum breaking device mounted in the valve body. The valve body has a periphery provided with multiple air vent holes corresponding to the vacuum breaking device. The vacuum breaking device includes a mounting barrel, an elastic member, a braking member, a mounting plate, a water stop gasket, and a water inlet disk. The vacuum breaking device is assembled previously and then directly fitted into the valve body to construct the vacuum breaker valve. Thus, the vacuum breaking device and the valve body are combined together for a whole sale or the vacuum breaking device and the valve body are sold individually.

4 Claims, 6 Drawing Sheets

VACUUM BREAKER VALVE

BACKGROUND OF THE INVENTION

Field of the Invention

The present invention relates to a breaker and, more particularly, to a vacuum breaker valve.

Description of the Related Art

A conventional freeze safe valve was disclosed in the U.S. Pat. No. 7,458,388, and comprises a body, an elastic element, a water stop pad, a water inlet tray, and a washer. The elastic element, the water stop pad, the water inlet tray, and the washer construct a vacuum breaking device. The body is provided with a first stepped portion, a second stepped portion, a third stepped portion, and a fourth stepped portion to accommodate the elastic element, the water stop pad, the water inlet tray, and the washer. The water stop pad is made of soft material. The water stop pad has a center provided with first water inlet holes, and the water inlet tray has a periphery provided with second water inlet holes misaligning with the first water inlet holes. A braking element is mounted between the elastic element and the water-stop pad. The body is provided with a ventilation hole communicating with the interior of the body. It is characterized in that, the body is integrally formed, and has two threaded parts formed on two ends thereof for locking connection of two pipelines, and the circumference of the water stop pad is provided with an upward-turned arc lip. Thus, the vacuum state is broken so that the water remaining in the pipelines is drained outward, to prevent the pipelines from being swollen and broken when the water freezes in the winter. However, the freeze safe valve is only available for a wholesale, and the vacuum breaking device cannot be sold individually.

BRIEF SUMMARY OF THE INVENTION

In accordance with the present invention, there is provided vacuum breaker valve comprising a valve body and a vacuum breaking device mounted in the valve body. The valve body has a periphery provided with multiple air vent holes corresponding to the vacuum breaking device. The vacuum breaking device includes a mounting barrel, an elastic member, a braking member, a mounting plate, a water stop gasket, and a water inlet disk. The mounting barrel is a hollow cylinder. The mounting barrel has an interior having a bottom face provided with a stepped rim. The mounting barrel has a lower end provided with a first flange. The mounting barrel has a bottom face provided with a first shaft hole. The braking member has a bottom face provided with multiple positioning portions equally spaced from each other. The bottom face of the braking member has a center provided with a shaft. The elastic member is a compression spring. The elastic member has a lower end pressing the stepped rim. The elastic member has an upper end pressing the positioning portions. The mounting plate has an interior having a bottom face provided with a second shaft hole and an inner stepped edge. The interior of the mounting plate has an upper end provided with a stop edge. The mounting plate has a periphery provided with multiple air inlet holes equally spaced from each other. The air inlet holes align with the air vent holes of the valve body. An ambient air is introduced through the air vent holes into the air inlet holes. The mounting plate has a bottom face provided with a positioning groove allowing insertion of the mounting barrel. The water stop gasket elastically presses a surface of the braking member. The water stop gasket is positioned by the stop edge of the mounting plate. The water stop gasket is made of resilient material. The water stop gasket has a center provided with a first water inlet hole. The water stop gasket has a top provided with a combination face. The combination face is provided with a positioning convex portion. The water stop gasket has a periphery provided with a second flange abutting the stop edge of the mounting plate. The water inlet disk has a periphery provided with multiple second water inlet holes equally spaced from each other. The water inlet disk is provided with a lip corresponding to an inner periphery of the water stop gasket. The water inlet disk has a bottom face provided with a positioning concave portion positioned on the positioning convex portion of the water stop gasket.

According to the primary advantages of the present invention, the vacuum breaking device is assembled previously and then directly fitted into the valve body to facilitate the user assembling the vacuum breaker valve. In addition, the vacuum breaking device and the valve body are combined together for a whole sale or the vacuum breaking device and the valve body are sold individually.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
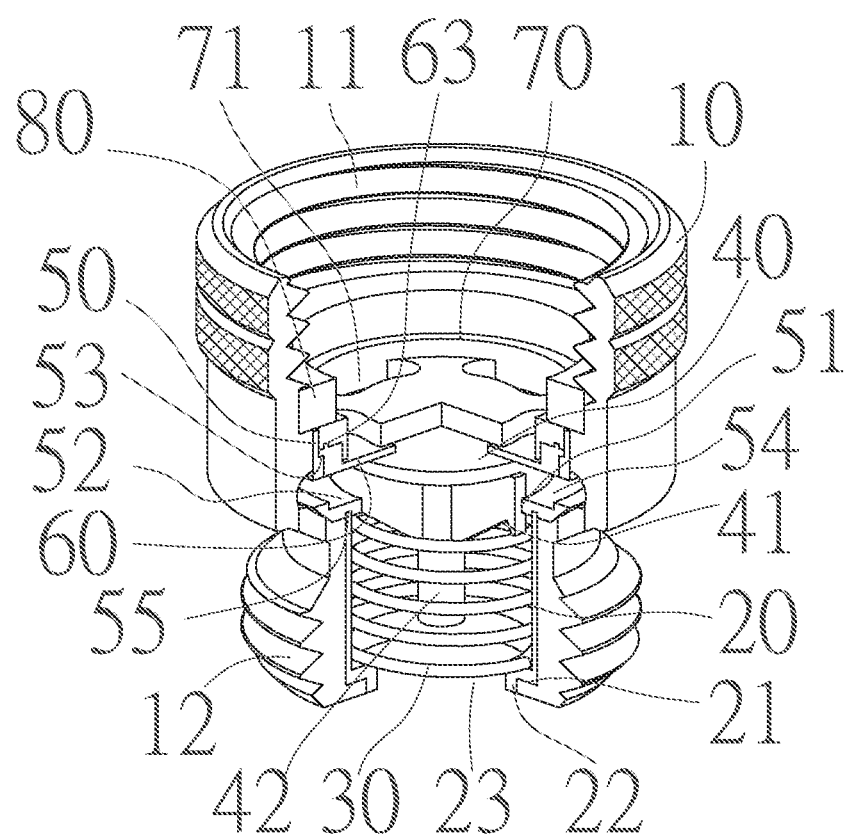
FIG. 1 is a partial perspective cross-sectional view of a vacuum breaker valve in accordance with the preferred embodiment of the present invention.
Figure 2:
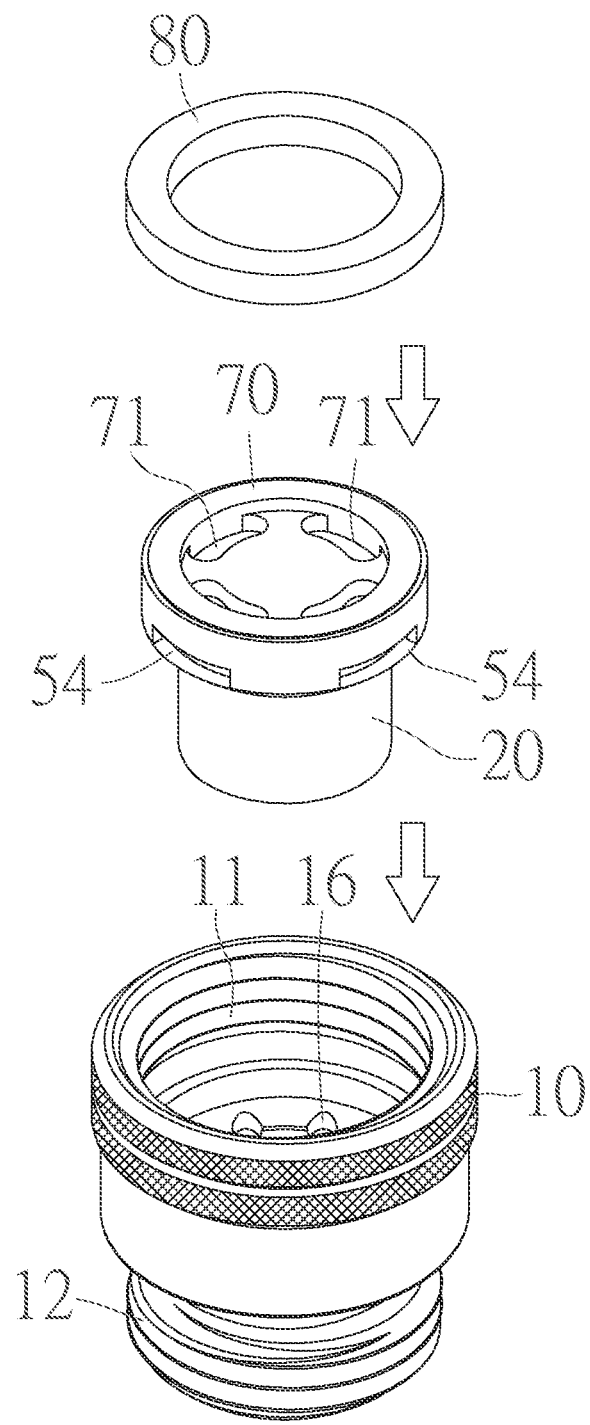
FIG. 2 is a perspective view showing assembly of the vacuum breaker valve in accordance with the preferred embodiment of the present invention.
Figure 3:
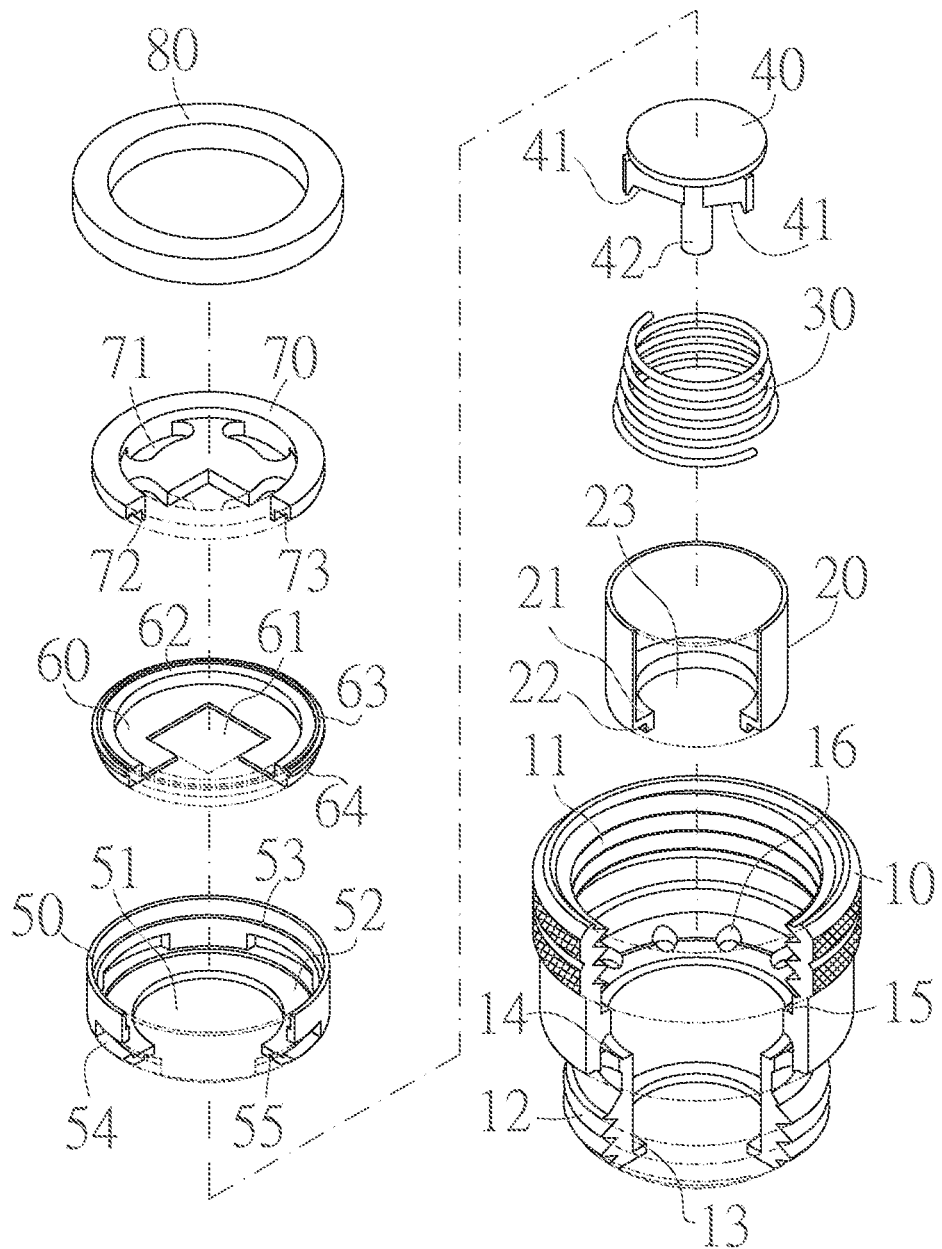
FIG. 3 is an exploded perspective view of the vacuum breaker valve in accordance with the preferred embodiment of the present invention.
Figure 4:
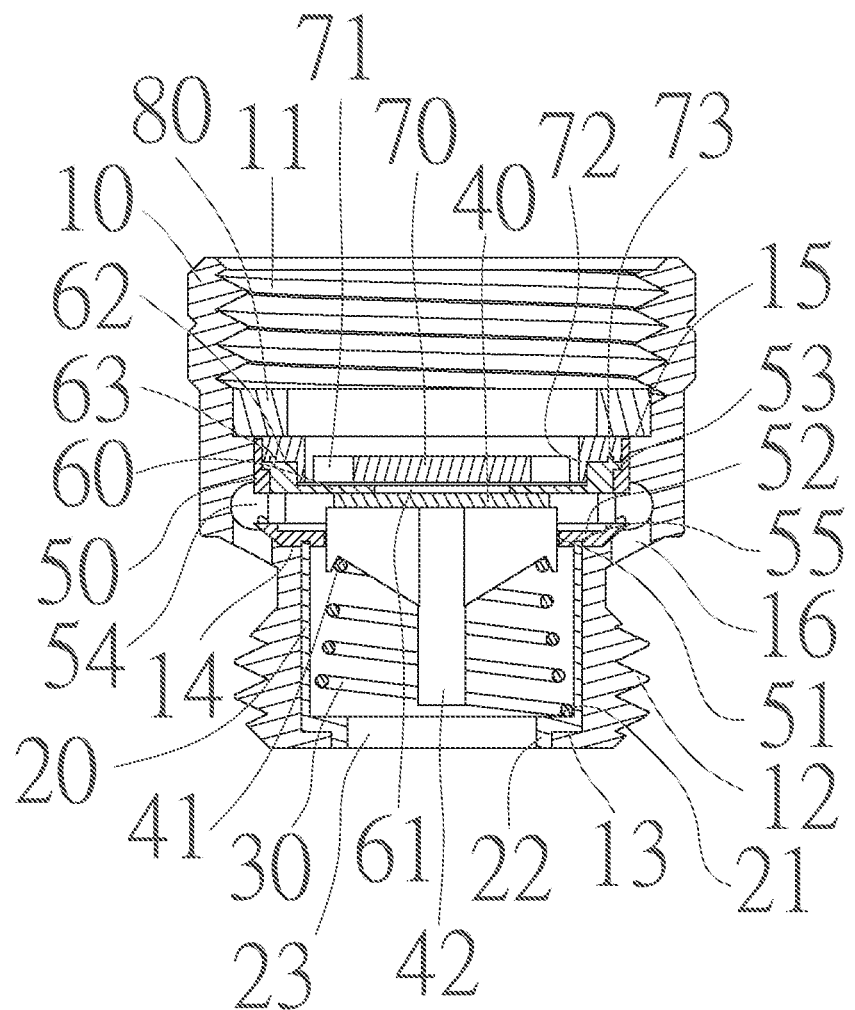
FIG. 4 is a cross-sectional view of the vacuum breaker valve as shown in FIG. 1.

Referring to the drawings and initially to FIGS. 1-4, a vacuum breaker valve in accordance with the preferred embodiment of the present invention comprises a valve body 10 and a vacuum breaking device mounted in the valve body 10.

The valve body 10 has a periphery provided with multiple air vent holes 16 corresponding to the vacuum breaking device.

The vacuum breaking device includes a mounting barrel 20, an elastic member 30, a braking member 40, a mounting plate (or cap) 50, a water stop gasket 60, and a water inlet disk (or cover) 70.

The mounting barrel 20 is a hollow cylinder. The mounting barrel 20 has an interior having a bottom face provided with a stepped rim 21. The mounting barrel 20 has a lower end provided with a first flange 22. The mounting barrel 20 has a bottom face provided with a first shaft hole (or through hole) 23.

The braking member 40 has a bottom face provided with multiple positioning portions 41 equally spaced from each other. The bottom face of the braking member 40 has a center provided with a shaft 42.

The elastic member 30 is a compression spring. The elastic member 30 has a lower end pressing the stepped rim 21. The elastic member 30 has an upper end pressing the positioning portions 41. The elastic member 30 and the braking member 40 are mounted in the mounting barrel 20.

The mounting plate 50 has an interior having a bottom face provided with a second shaft hole (or through hole) 51 and an inner stepped edge 52. The interior of the mounting plate 50 has an upper end provided with a stop (or positioning) edge 53. The mounting plate 50 has a periphery provided with multiple air inlet holes 54 equally spaced from each other. The air inlet holes 54 align with the air vent holes 16 of the valve body 10. An ambient air is introduced through the air vent holes 16 into the air inlet holes 54. The mounting plate 50 has a bottom face provided with a positioning groove 55 allowing insertion of the mounting barrel 20 so that the mounting plate 50 and the mounting barrel 20 are assembled and combined together.

The water stop gasket 60 is mounted in the mounting plate 50. The water stop gasket 60 elastically presses a surface of the braking member 40. The water stop gasket 60 is positioned (or stopped) by the stop edge 53 of the mounting plate 50. The water stop gasket 60 is made of resilient material. The water stop gasket 60 has a center provided with a first water inlet hole 61. The water stop gasket 60 has a top provided with a combination (or coupling or connecting or joint or abutting) face 62. The combination face 62 is provided with a positioning convex portion 63. The water stop gasket 60 has a periphery provided with a second flange 64 abutting (or positioned on) the stop edge 53 of the mounting plate 50.

The water inlet disk 70 has a periphery provided with multiple second water inlet holes 71 equally spaced from each other. The water inlet disk 70 is provided with a lip 72 corresponding to an inner periphery of the water stop gasket 60. Preferably, the lip 72 of the water inlet disk 70 rests on the combination face 62 of the water stop gasket 60. The water inlet disk 70 has a bottom face provided with a positioning concave portion 73 positioned on the positioning convex portion 63 of the water stop gasket 60 so that the water inlet disk 70 and the water stop gasket 60 are assembled and combined together.

Figure 5:
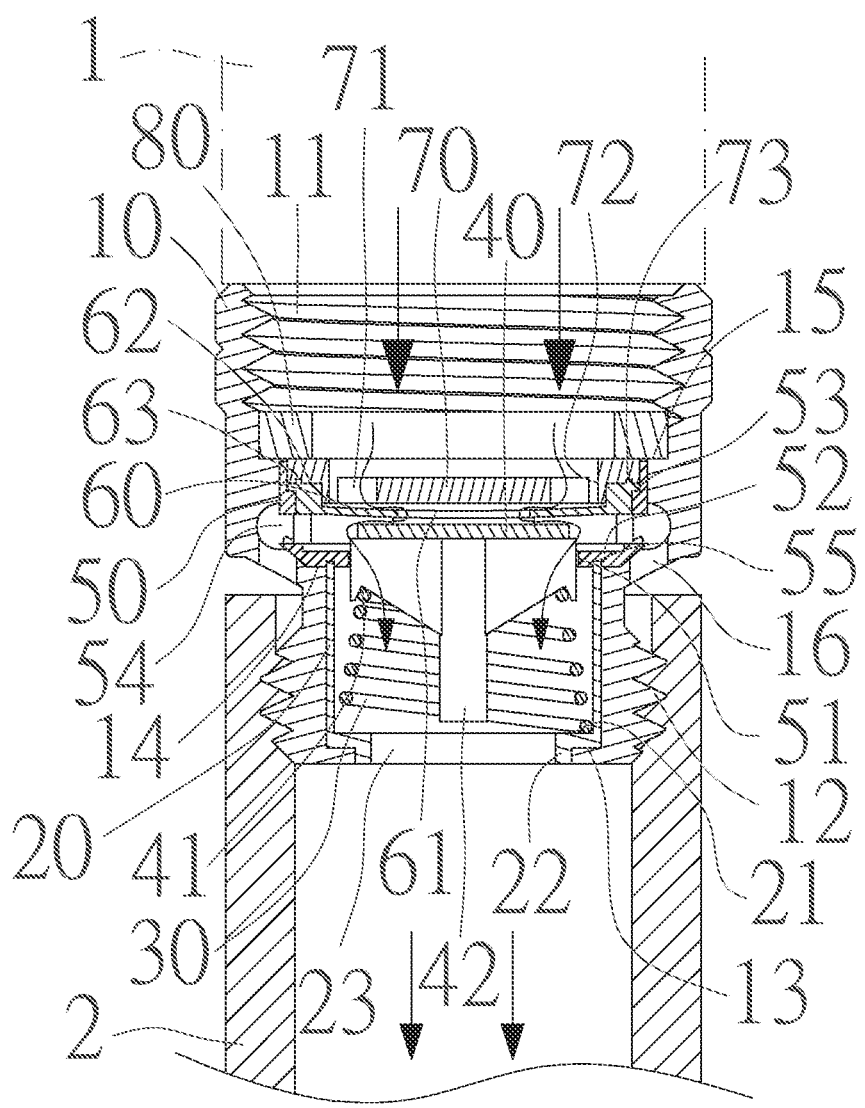
FIG. 5 is a schematic operational view of the vacuum breaker valve as shown in FIG. 4, wherein water flows into the vacuum breaker valve.

In the preferred embodiment of the present invention, the valve body 10 has a first end provided with an internal threaded portion 11 for mounting a first pipe 1 (see FIG. 5) and a second end provided with an external threaded portion 12 for mounting a second pipe 2 (see FIG. 5).

In the preferred embodiment of the present invention, the valve body 10 has an interior provided with a first stepped positioning (or abutting) edge 13, a second stepped positioning (or abutting) edge 14 disposed above the first stepped positioning edge 13, and a third stepped positioning (or abutting) edge 15 disposed above the second stepped positioning edge 14. The mounting barrel 20 is positioned on (or rests on) the first stepped positioning edge 13. The mounting plate 50 is positioned on (or rests on) the second stepped positioning edge 14. The vacuum breaker valve further comprises a washer 80 mounted in the valve body 10. The washer 80 is positioned on (or rests on) the third stepped positioning edge 15. The washer 80 is closely fitted between the first pipe 1 and the valve body 10 when the first pipe 1 is screwed into the internal threaded portion 11.

In the preferred embodiment of the present invention, the first water inlet hole 61 of the water stop gasket 60 has a square shape.

In the preferred embodiment of the present invention, the air vent holes 16 are connected to the interior of the valve body 10 and align with the second stepped positioning edge 14.

In assembly, the mounting barrel 20, the elastic member 30, the braking member 40, the mounting plate 50, the water stop gasket 60, and the water inlet disk 70 construct the vacuum breaking device. Accordingly, the vacuum breaking device is assembled previously and then directly fitted into the valve body 10 to facilitate the user assembling the vacuum breaker valve. In addition, the vacuum breaking device and the valve body 10 are combined together for a whole sale or the vacuum breaking device and the valve body 10 are sold individually. Further, the vacuum breaker valve is made easily to decrease the cost of fabrication.

In operation, referring to FIG. 5 with reference to FIGS. 1-4, water from the first pipe 1 flows through the second water inlet holes 71 of the water inlet disk 70 into the valve body 10 and pushes the water stop gasket 60 to move downward. At this time, the water stop gasket 60 closes the air vent holes 16 of the valve body 10. Then, the water flows through the first water inlet hole 61 of the water stop gasket 60 and pushes the braking member 40 to move downward. At this time, the elastic member 30 is compressed. Then, the water flows through the mounting barrel 20 and the valve body 10, and finally flows outward through the second pipe 2.

Figure 6:
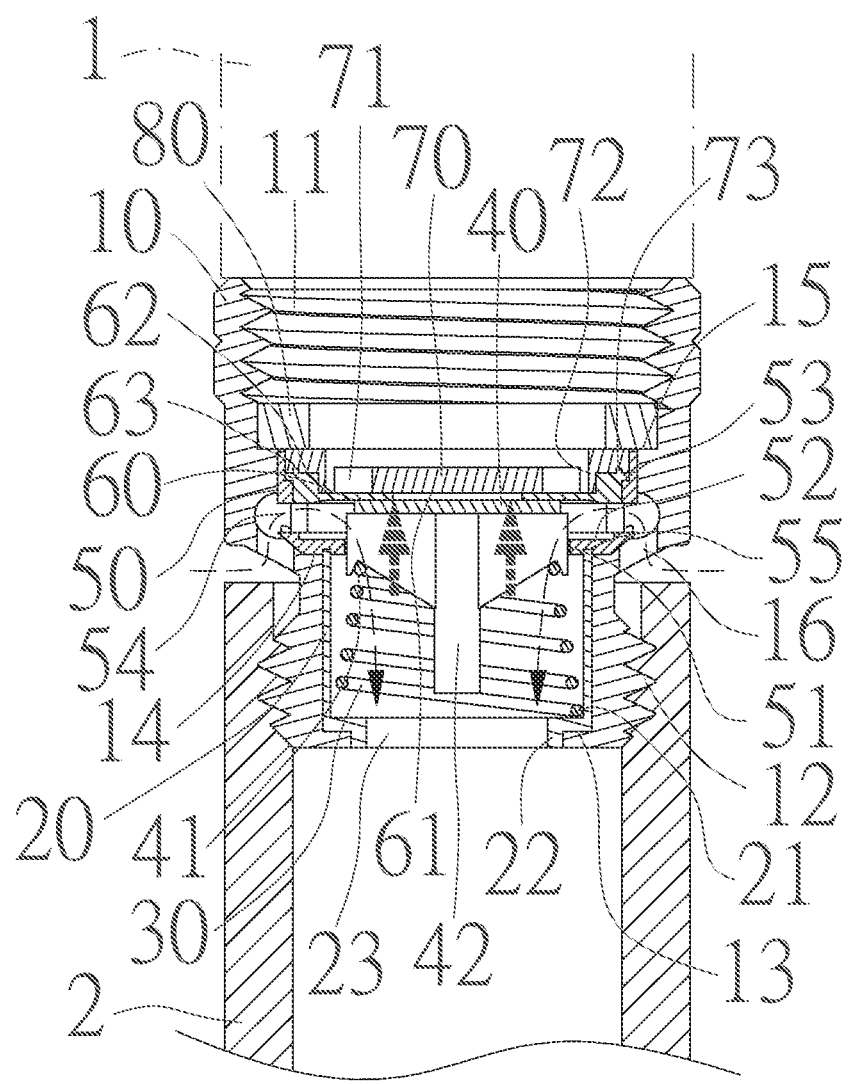
FIG. 6 is another schematic operational view of the vacuum breaker valve as shown in FIG. 4, wherein water stops entering the vacuum breaker, and a vacuum state in the vacuum breaker is broken.

Referring to FIG. 6 with reference to FIGS. 1-4, when the water flow is stopped, the braking member 40 is pushed upward by the restoring force of the elastic member 30, and the water stop gasket 60 is pushed upward by the braking member 40 to open the connection between the air vent holes 16 and the interior of the valve body 10, so that the ambient air is introduced through the air vent holes 16 of the valve body 10 into the air inlet holes 54 of the mounting plate 50. In such a manner, the vacuum state is broken so that the water remaining in the second pipe 2 is drained outward smoothly, to prevent the second pipe 2 from being swollen and broken when the water freezes in the winter.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. A vacuum breaker valve comprising:
a valve body; and
a vacuum breaking device mounted in the valve body;
wherein:
the valve body has a periphery provided with multiple air vent holes corresponding to the vacuum breaking device;
the vacuum breaking device includes a mounting barrel, an elastic member, a braking member, a mounting plate, a water stop gasket, and a water inlet disk;
the mounting barrel is a hollow cylinder;
the mounting barrel has an interior having a bottom face provided with a stepped rim;

the mounting barrel has a lower end provided with a first flange;

the mounting barrel has a bottom face provided with a first shaft hole;

the braking member has a bottom face provided with multiple positioning portions equally spaced from each other;

the bottom face of the braking member has a center provided with a shaft;

the elastic member is a compression spring;

the elastic member has a lower end pressing the stepped rim;

the elastic member has an upper end pressing the positioning portions;

the mounting plate has an interior having a bottom face provided with a second shaft hole and an inner stepped edge;

the interior of the mounting plate has an upper end provided with a stop edge;

the mounting plate has a periphery provided with multiple air inlet holes equally spaced from each other;

the multiple air inlet holes align with the multiple air vent holes of the valve body;

an ambient air is introduced through the multiple air vent holes into the multiple air inlet holes;

the mounting plate has a bottom face provided with a positioning groove allowing insertion of the mounting barrel;

the water stop gasket elastically presses a surface of the braking member;

the water stop gasket is positioned by the stop edge of the mounting plate;

the water stop gasket is made of resilient material;

the water stop gasket has a center provided with a first water inlet hole;

the water stop gasket has a top provided with a combination face;

the combination face is provided with a positioning convex portion;

the water stop gasket has a periphery provided with a second flange abutting the stop edge of the mounting plate;

the water inlet disk has a periphery provided with multiple second water inlet holes equally spaced from each other;

the water inlet disk is provided with a lip corresponding to an inner periphery of the water stop gasket; and the water inlet disk has a bottom face provided with a positioning concave portion positioned on the positioning convex portion of the water stop gasket.

2. The vacuum breaker valve as claimed in claim 1, wherein the valve body has a first end provided with an internal threaded portion for mounting a first pipe and a second end provided with an external threaded portion for mounting a second pipe.

3. The vacuum breaker valve as claimed in claim 1, wherein:

the valve body has an interior provided with a first stepped positioning edge, a second stepped positioning edge disposed above the first stepped positioning edge, and a third stepped positioning edge disposed above the second stepped positioning edge;

the mounting barrel is positioned on the first stepped positioning edge;

the mounting plate is positioned on the second stepped positioning edge;

the vacuum breaker valve further comprises a washer mounted in the valve body; and the washer is positioned on the third stepped positioning edge.

4. The vacuum breaker valve as claimed in claim 1, wherein the first water inlet hole of the water stop gasket has a square shape.

* * * * *